United States Patent [19]

Daradimos et al.

[11] Patent Number: 4,676,824
[45] Date of Patent: Jun. 30, 1987

[54] PROCESS FOR GENERATING HEAT AND PRODUCING SPONGE IRON

[75] Inventors: Georg Daradimos, Rossbach; Martin Hirsch, Friedrichsdorf; Wolfram Schnabel, Idstein, all of Fed. Rep. of Germany

[73] Assignee: Metallgesellschaft Aktiengesellschaft, Frankfurt am Main, Fed. Rep. of Germany

[21] Appl. No.: 761,017

[22] Filed: Jul. 31, 1985

[30] Foreign Application Priority Data

Aug. 4, 1984 [DE] Fed. Rep. of Germany ....... 3428782

[51] Int. Cl.$^4$ .......................................... C21B 13/08
[52] U.S. Cl. ...................................... 75/36; 432/106; 266/160; 266/173
[58] Field of Search .................... 75/36, 33; 266/160, 266/173

[56] References Cited

U.S. PATENT DOCUMENTS

| | | | |
|---|---|---|---|
| 3,918,958 | 11/1975 | Heitmann | 75/36 |
| 3,985,544 | 10/1976 | Collin et al. | 75/11 |
| 4,111,158 | 9/1978 | Reh et al. | 122/4 D |
| 4,165,717 | 8/1979 | Reh et al. | 431/7 |
| 4,415,357 | 11/1983 | Bauer | 75/36 |
| 4,490,168 | 12/1984 | Formanek et al. | 75/10 R |
| 4,539,188 | 9/1985 | Hirsch et al. | 423/210 |

Primary Examiner—Melvyn J. Andrews

[57] ABSTRACT

Sponge iron is produced by a direct reduction of iron oxide containing materials in a rotary kiln, the material discharged from the rotary kiln is separated into sponge iron and material which contains surplus carbon, the carbon-containing material is burnt in a fluidized bed reactor containing a circulating fluidized bed, and the heat generated by the combustion is recovered and utilized to produce electric power. To ensure a utilization of the surplus energies of the rotary kiln process and to minimize the contents of $SO_2$, $NO_X$, and CaS, the dust-containing exhaust gas from the rotary kiln is supplied to the fluidized bed reactor and is afterburnt therein, at least a major part of all oxygen-containing gases supplied to the fluidized bed reactor is supplied as a fluidizing gas to the lower portion of the fluidized bed reactor, the combustion of the combustible constituents is effected with an over-stoichiometric oxygen content, and the solids entrained by the gases discharged from the fluidized bed reactor are recycled to the fluidized bed reactor in such a manner that the weight of solids circulated per hour is at least 5 times the weight of the solids contained in the fluidized bed reactor.

11 Claims, 1 Drawing Figure

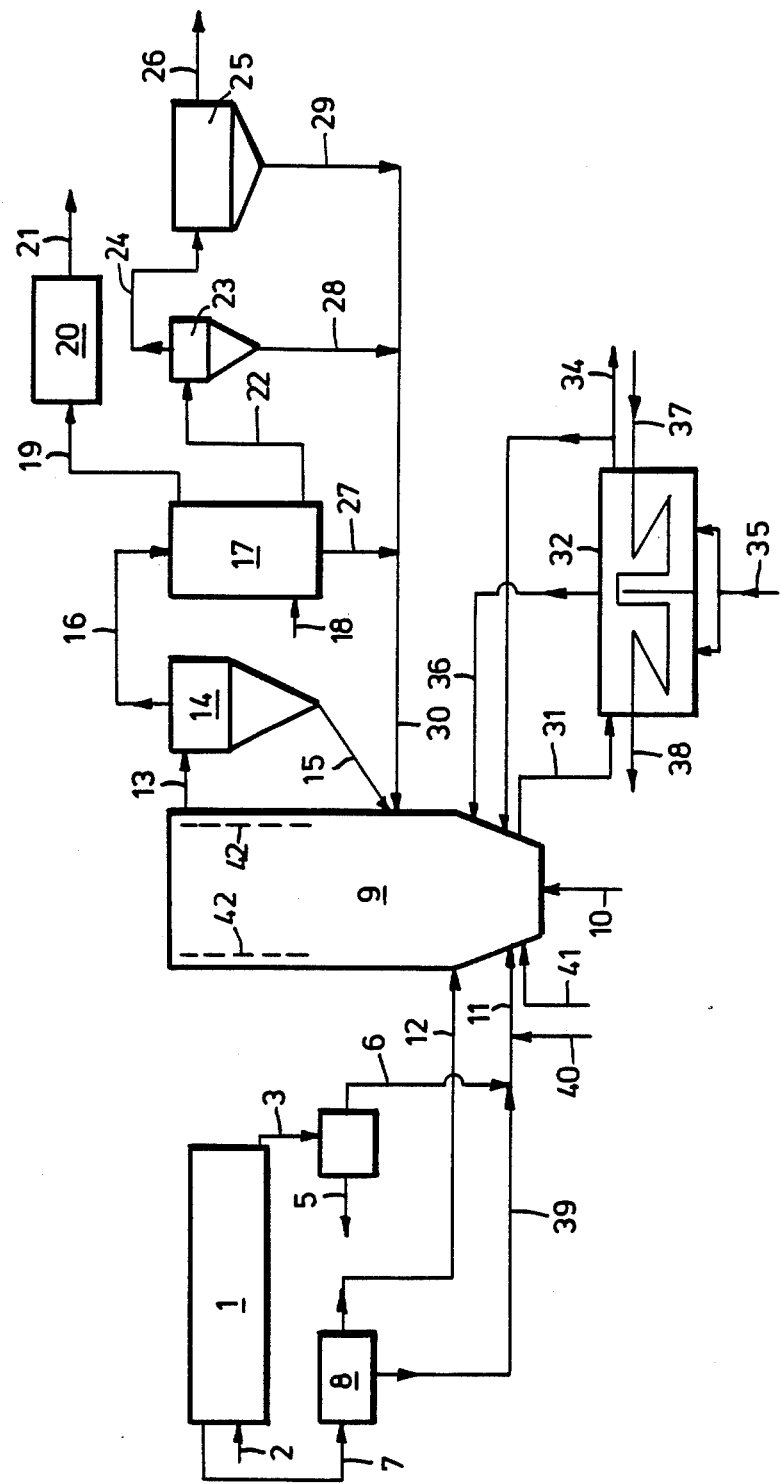

PROCESS FOR GENERATING HEAT AND PRODUCING SPONGE IRON

BACKGROUND OF INVENTION

This invention relates to a process of producing sponge iron by a direct reduction of iron oxide containing materials with solid carbonaceous reducing agents in a rotary kiln, wherein the material discharged from the rotary kiln is separated into sponge iron and material which contains surplus carbon, the carbon-containing material is burnt in a fluidized bed reactor containing a circulating fluidized bed, and the heat generated by the combustion is dissipated and utilized to produce electric power.

In the production of sponge iron by a direct reduction with solid carbonaceous reducing agents in a rotary kiln, only the fixed carbon (FC) content of the reducing agent can be utilized for the reduction. In most cases the combustible volatile constituents of the reducing agent can be used only in part to preheat the charge in the heating-up zone. As a result, the exhaust gas still contains combustible gaseous constituents as well as entrained dusts, which consist in part of combustible reducing agent. The content of combustible volatile constituents in the exhaust gas is relatively high, particularly if coals having a high content of volatile constituents, such as brown coals, are used. For this reason the exhaust gas must be afterburnt if its combustible heat content is to be recovered in addition to its sensible heat content. In order to avoid a reoxidation of the sponge iron product the process must be so controlled that the material discharged from the kiln contains a relatively large or relatively small surplus of carbon in dependence on the reactivity of the coal used as a reducing agent. In addition to that surplus, the material which is discharged contains the ash which has been formed and the sulfur, combined as CaS, which are separated from the sponge iron.

It is known from Laid-open German Application 33 00 867 to afterburn the exhaust gas from the rotary kiln in an afterburning chamber, to utilize the heat content of the exhaust gas for the production of steam, and to utilize the steam for a generation of electric power. In order to avoid overheating and incrustation, the afterburning must be carried out in a plurality of stages and with cooling by sprayed water for temperature control. The latent heat of evaporation cannot be utilized for the production of steam. In that process the fine-grained solids contained in the exhaust gas are not completely burnt. The nonmagnetic material which has been separated from the sponge iron contained in the material discharged from the rotary kiln is burnt in a circulating fluidized bed. The heat generated by the combustion is used via a steam generator for the generation of electric power. The combustible constituents of the exhaust gas are utilized only in part and the $SO_2$ which is contained in the exhaust gas and constitutes a pollutant is not removed.

SUMMARY OF THE INVENTION

It is an object of the invention to obtain an improved process utilizing all surplus energy which cannot be utilized for reduction in the rotary kiln and to minimize the pollution by, e.g., $SO_2$, $NO_x$ and CaS.

This object is accomplished in accordance with the invention in that the dust-containing exhaust gas from the rotary kiln is supplied to the fluidized bed reactor and is afterburnt therein, at least a major part of all oxygen-containing gases supplied to the fluidized bed reactor is supplied as a fluidizing gas to the lower portion of the fluidized bed reactor, the combustion of the combustible constituents is effected with an over-stoichiometric oxygen content, and the solids entrained by the gases discharged from the fluidized bed reactor are recycled to the fluidized bed reactor in such a manner that the weight of solids circulated per hour is at least 5 times the weight of the solids contained in the fluidized bed reactor.

The fluidized bed used in accordance with the invention differs from an "orthodox" fluidized bed, in which a dense phase is separated by a sudden density change from an overlying gas space, and comprises states of distribution without a defined boundary layer. There is no sudden density change between a dense phase and an overlying gas space but the solids concentration in the reactor decreases continuously from bottom to top.

The definition of the operating conditions by means of the characteristic numbers of Froude and Archimedes results in the ranges:

$$0.1 \leq \frac{3}{4} \times F_r^2 \times \frac{\rho_g}{\rho_k - \rho_g} \leq 10$$

and $$0.01 \leq Ar \leq 100$$

wherein $$Ar = \frac{d_k^3 \times g (\rho_k - \rho_g)}{\rho_g \times \nu^2}$$

and $$F_r^2 = \frac{u^2}{g \times d_k}$$

and
u = the relative gas velocity in m/s
Ar = the Archimedes number
$F_r$ = the Froude number
$\rho_g$ = the density of the gas in kg/m³
$\rho_k$ = the density of the solid particle in kg/m³
$d_k$ = the diameter of the spherical particle in m
$\gamma$ = the kinematic viscosity in m²/s
g = the constant of gravitation in m/s²

Processes of burning solid carbonaceous materials in a circulating fluidized bed are basically described in U.S. Pat. Nos. 4,165,717 and 4,111,158. The fluidized bed reactor may be circular or rectangular in cross section. The lower portion may alternatively be conical; this will be desirable particularly if the rate of oxygen-containing fluidizing gas is relatively low. The dust-containing exhaust gas is preferably introduced above the inlet for the fluidizing gas in a height of up to 30% of the total height of the reactor, and may be supplied on a plurality of levels. The gas velocity in the reactor above the secondary gas inlet is in the range of 4 to 10 m/sec. The mean particle diameter of the bed material in the reactor is in the range from 50 to 500 μm. The temperature in the reactor is adjusted to be within a range from 800° to 1000° C. Air is generally used as an oxygen-containing fluidizing gas. The fluidizing gas is supplied through the bottom or in the region up to 10% of the height of the reactor above the bottom. If the temperature in the reactor is controlled only by the control of the excess of air, the entire heat generated by the combustion will be utilized in a waste heat boiler by a heat exchange of the exhaust gas. A more effective utilization of heat and lower plant and operating costs can be achieved if the combustion is effected with an excess of air below about 80% and part of the heat generated by the combustion is dissipated via cooling surfaces provided in the fluidized bed reactor and/or in that a stream of solids withddrawn from the reactor is circulated through and cooled in a fluidized bed cooler and the exhaust air from the fluidized bed cooler is supplied to the fluidized bed reactor. If a circulating stream is cooled, the exhaust air from the fluidized bed cooler will be supplied not only to the lower portion of the reactor but to a region from about 10% to 30% of the height of the reactor, measured from below, and at least 60% of the total quantity of the oxygen-containing gases are supplied to the lower region. The rotary kiln may be operated for a countercurrent or cocurrent contact between the solid charge and the gas atmosphere.

In a preferred embodiment, the overstoichiomatric combustion is effected with an excess of air of 20 to 80%, a stream of solids is withdrawn from the fluidized bed reactor and is indirectly cooled in a fluidized bed cooler and recycled to the fluidized bed reactor and the heated fluidizing gases from the fluidized bed cooler are supplied as a secondary gas to bed reactor and/or heat is dissipated via cooling surfaces provided in the fluidized bed reactor, and the heated cooling fluid is used to produce electric power. If the excess of air is in the range from 20 to 80%, particularly in the range from 30 to 60%, a very good oxidation of CaS to $CaSO_4$ and a very good reaction of $SO_2$ with CaO to form $CaSO_4$ will be achieved as well as a complete combustion of all combustible constituents and an economic utilization of the heat generated by the combustion. A dissipation of heat by a cooling of circulated solids will be used particularly in problematic solids are used because the danger of a soiling of cooling surfaces is lower in the fluidized bed cooler.

In a preferred embodiment the material which contains surplus carbon and the dust-containing exhaust gas from the rotary kiln are supplied to the fluidized bed reactor above the inlet for the fluidizing gases. This arrangement will result in a lower gas pressure drop and nevertheless will ensure that the residence time is sufficient for a complete combustion.

In a preferred embodiment, the fluidized bed reactor is additionally supplied with fresh carbonaceous material. This step permits a generation of additional electric power and a compensation of fluctuations in a simple matter.

In a preferred embodiment, the mean density of the suspension in the fluidized bed reactor above the inlet for the exhaust gas from the rotary kiln is adjusted to 5 to 50 kg/m$^3$. Preferably, the density of the suspension is 5 to 20 kg/m$^3$ if circulating solids are cooled in a fluidized bed, and 15 to 30 kg/m$^3$ if a cooling is effected by cooling surfaces provided in the reactor, and in case of a supply of fresh coal at relatively high rates is 15 to 30 kg/m$^3$ in the first case and 20 to 50 kg/m$^3$ in the second case. These values will result in each case in a very good temperature control in the fluidized bed reactor by a corresponding dissipation of heat.

In a preferred embodiment, dusts which become available in the plant are supplied to the fluidized bed reactor. Dusts become available in the plant, e.g., as a result of the disintegration of the coal, at transfer points of the transport route, and as a result of a collection of dust from rooms. Such dusts can easily be eliminated in that manner and their content of combustible constituents will be utilized in that case.

In a preferred embodiment, a sulfur-combining material is supplied to the fluidized bed reactor. That material will be supplied if the molar ratio of Ca:S in the solids discharged from the rotary kiln is below a range of 1.2 to 1.5. That step ensures that the $SO_2$ content of the exhaust gas from the fluidized bed reactor will be below 200 mg/standard m$^3$.

The various features of novelty which characterize the invention are pointed out with particularity in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWING

The FIGURE schematically depicts the process of the invention.

DESCRIPTION OF PREFERRED EMBODIMENT

Rotary kiln 1 is supplied at its charging end with a charge 2 consisting of ore, coal and fluxes. The discharged material 3 is separated in separating stage 4 into sponge iron 5 and nonmagnetic material 6. Nonmagnetic material 6 contains surplus carbon, ash, and desulfurizing agent. Kiln exhaust gas 7 is supplied to a dust chamber 8. Fluidizing air 10 is supplied to a lower portion of fluidized bed reactor 9. Nonmagnetic material 6 is supplied through line 11 to the lower region of the fluidized bed reactor 9. The exhaust gas from the dust chamber 8 is supplied to the fluidized bed reactor 9 through line 12 above the inlet connected to line 11. A gas solids-suspension is formed in the fluidized bed reactor 9 and occupies the entire fluidized bed reactor and from the top of the reactor passes through line 13 to a recycling cyclone 14, wherein gas and solids are separated. The separated solids are recycled through line 15 to the fluidized bed reactor. The purified gas from cyclone 14 is supplied through line 16 to a steam generator 17 and is cooled therein by indirect heat exchange with cooling fluid 18, which is thus transformed into superheated steam and supplied through line 19 to a plant 20 for generating electric power. The electric power is supplied via line 21 to the consumers.

The gas leaving the steam generator 17 is supplied through line 22 to a cyclone separator 23 and from the latter via line 24 to an electrostatic gas purifier 25. The precipitator gas is discharged through line 26 into the atmosphere. The dusts 27, 28, 29 which are respectively collected in the steam generator 17, the cyclone separator 23 and the electrostatic gas purifier 25 are recycled to the fluidized bed reactor through line 30.

Part of the solids is supplied from the lower region of the fluidized bed reactor 9 through line 31 to the fluidized bed cooler 32 and, after an indirect cooling, is recycled through line 33 to the fluidized bed reactor 9. Part of the solids is discharged through line 34 for disposal.

The fluidized bed cooler 32 consists of two sections and is supplied with fluidizing air 35 from below. The heated waste air is withdrawn from the top of the cooler and through line 36 is supplied as secondary air to the fluidized bed reactor 9. In the fluidized bed cooler 32, the solids are cooled by an indirect heat exchange with condensate 37, which is supplied from the steam header of the steam generator 17. The saturated steam produced as a result of the heat exchange is withdrawn through line 38 and supplied to the steam generator 17. The dust collected in the dust chamber 8 is supplied through line 39 to the fluidized bed reactor 9.

Through line 40, the fluidized bed reactor 9 is supplied with dusts which become available as a result of the disintegration of the coal and at transfer points and as dusts collected from rooms. Dusts which become available during the further processing of the sponge iron or in adjacent plants may also be supplied. Fresh coal may be supplied to the fluidized bed reactor 9 through line 41. The reactor 9 may contain cooling surfaces 42, which are connected to the steam generator 17.

EXAMPLE

The rotary kiln was supplied with burnt pellets which were 8 to 16 mm in diameter. The pellets had the following chemical composition in weight percent:

| | |
|---|---|
| $Fe_{total}$ | 67 |
| $Fe^{++}$ | 0.8 |
| CaO | 0.6 |
| MgO | 0.3 |
| $SiO_2$ | 2.0 |
| $Al_2O_3$ | 0.9 |
| Others | 0.5 |

The reducing agent consisted of brown coal briquettes which contained 15% moisture and had a particle size below 40 mm. They had the following composition in weight percent on a dry basis:

| | |
|---|---|
| FC | 44 |
| Volatile constituents | 51 |
| Ash | 5 |
| S | 0.5 |

The rotary kiln was charged with the pellets at a rate of 37,050 kg/h, with brown coal at a rate of 21,900 kg/h. The total charge contained 4,240 kg/h water. Air was introduced at a rate of 75,000 sm$^3$/h. The material discharged from the kilm consisted of sponge iron at a rate of 26,350 kg/h and nonmagnetic material at a rate of 1120 kg/h. The non-magnetic material contained fixed carbon at a rate of 240 kg/h. Exhaust gas was discharged at a rate of 101,300 sm$^3$/h and contained dust at a rate of 2020 kg/h. THe dust contained fixed carbon at rate of 730 kg/h. The exhaust gas had the following composition in volume percent:

| | |
|---|---|
| CO | 6.5 |
| $CO_2$ | 18.1 |
| $H_2$ | 3.2 |
| $H_2O$ | 14.8 |
| $N_2$ | 57.4 |

The exhaust gas temperature was 850° C.

Fluidizing air at a rate of 34,000 sm$^3$/h was blown into the fluidized bed reactor. Solids at a rate of 216,000 kg/h were supplied from the fluidized bed reactor to the fluidized bed cooler. From the latter, solids at a rate of 2200 kg/h were dumped and the remained was recycled at a temperature of 400° C. to the fluidized bed reactor. Fludizing air at a rate of 14,000 sm$^3$/h was supplied to the fluidizing bed cooler and at a temperature of 500° C. was supplied as secondary air to the fluidized bed reactor. The cooling fluid consisted of condensate, which was supplied at a rate of 67,500 kg/h from the steam header of the steam generator to the fluidized bed cooler and was recycled as saturated steam to the superheater. Gas containing 150 g/sm$^3$ dust was supplied at a rate of 144,400 sm$^3$/h and at a temperature of 850° C. from the separating cyclone to the steam generator. The gas was purified in the succeeding separating cyclone to 10 g/sm$^3$ and in the electrostatic gas purifier to about 50 mg/sm$^3$. Dust at a rate of 20,200 kg/h was collected in the steam generator, the cyclone and the electrostatic gas purifier and was recycled to the fluidized bed reactor. Steam at 100 bars and 500° C. was generated in the steam generator at a rate of 84,200 kg/h. The net electric power produced thereby amounted to 25 MW. The exhaust gas contained less than 200 mg/sm$^3$ $SO_2$ and less than 200 mg/sm$^3$ $NO_x$. THe sulfur was virtually entirely eliminated as $CaSO_4$ in the dust.

The advantages afforded by the invention reside mainly in that the entire waste heat which becomes available as a result of the direct reduction in the rotary kiln is utilized for the production of electric power in an economical manner in a single unit operating at high efficiency, all solids become available in a form in which they can be dumped, and that the contents of pollutants, such as $SO_2$ and $NO_X$, in the waste gas is minimized. The electric power produced can easily be adapted to the demand because in case of a decreasing demand it is possible to store solid carbonaceous material and in case of a rising demand it is possible to consume the stored material or to supply additional fresh coal. The other demand can be met even during a standstill of the rotary kiln.

It will be understood that the specification and example are illustrative but not limitative of the present invention and that other embodiments with the spirit and scope of the invention will suggest themselves to there skilled in the art.

What is claimed:

1. A process for generating heat and producing sponge iron by a direct reduction of iron oxide containing materials with solid carbonaceous reducing agents in a rotary kiln, comprising:
   (a) discharging a solid material containing sponge iron and a surplus carbon containing material and exhausting an exhaust gas containing dust from the rotary kiln, said exhaust gas having a combustible content therein;
   (b) separating the discharge solid material into sponge iron and a surplus carbon containing material;
   (c) introducing said surplus carbon-containing material into a fluidized bed reactor having a circulating gas-solids suspension therein;
   (d) introducing the dust containing exhaust gas of the rotary kiln into a dust chamber to remove dust from said exhaust gas to form a removed dust phase and a gas stream, said gas stream having said combustible content therein and containing any residually entrained dust;
   (e) introducing into the fluidized bed reactor a gas phase containing said gas stream;

(f) supplying the removed dust phase from the dust chamber separately to the fluidized bed reactor;

(g) supplying oxygen containing gases to the fluidized bed reactor, at least a major portion thereof being supplied to a lower section of the reactor;

(h) combusting carbon of the surplus carbon containing material and the combustible content of said gas phase with an excess oxygen content in said fluidized bed reactor to generate heat;

(i) recovering the generated heat and utilizing the same to generate power;

(j) discharging from the fluidized bed reactor a reactor exhaust gas with entrained solids;

(k) separating the entrained solids from the reactor exhaust gas; and (l) recycling the separated solids to the fluidized bed reactor in an amount such that the weight of solids circulated per hour is at least five times the weight of solids contained in the fluidized bed reactor.

2. The process of claim 1, wherein the oxygen containing gas is introduced in an excess of 20 to 80% over that amount of oxygen containing gas stoichiometrically required for combustion.

3. The process of claim 1, further comprising indirectly cooling, in a fluidized bed cooler, a stream of solids withdrawn from the fluidized bed reactor, with a fluid stream wherein said fluid stream is heated and used to produce electric power; and recycling at least a portion of the cooled solids to the reactor.

4. The process of claim 1, further comprising dissipating the generated heat with a cooling fluid via cooling surfaces to produce a heated fluid, said cooling surfaces being in contact with the solids gas suspension in the fluidized bed reactor.

5. The process of claim 4, further comprising using the heated fluid to produce electric power.

6. The process of claim 1, wherein the fluidized bed reactor has an inlet for the fluidizing gases, the process further comprising supplying the surplus carbon containing material and the gas stream from the dust chamber to the fluidized bed reactor above the inlet for the fluidizing gases.

7. The process of claim 3, further comprising introducing a fluidizing gas in said fluidized bed cooler to fluidize the withdrawn solids; exhausting said fluidizing gas from the fluidized bed cooler; and introducing the exhausted gas, as secondary gas, into the fluidized bed reactor.

8. The process of claim 1, further comprising supplying fresh carbonaceous material to the fluidized bed reactor.

9. The process of claim 1, further comprising adjusting the gas solids suspension in the fluidized bed reactor above the inlet for the gas stream from the dust chamber to a means suspension density of 5 to 50 kg/m$^3$.

10. The process of claim 1, further comprising supplying dusts which become available from other sources to the fluidized bed reactor.

11. The process of claim 1, further comprising introducing a sulfur-combining material into the fluidized bed reactor.

* * * * *